(12) United States Patent
Lu

(10) Patent No.: US 9,099,928 B2
(45) Date of Patent: Aug. 4, 2015

(54) SYNCHRONOUS RECTIFYING APPARATUS AND CONTROLLING METHOD THEREOF

(71) Applicant: Shengli Lu, Taoyuan Hsien (TW)

(72) Inventor: Shengli Lu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 282 days.

(21) Appl. No.: 13/711,223

(22) Filed: Dec. 11, 2012

(65) Prior Publication Data
US 2014/0029311 A1    Jan. 30, 2014

(30) Foreign Application Priority Data

Jul. 30, 2012  (CN) .......................... 2012 1 0268727

(51) Int. Cl.
*H02M 3/335* (2006.01)
*H02M 3/24* (2006.01)

(52) U.S. Cl.
CPC ...... *H02M 3/33592* (2013.01); *H02M 3/33538* (2013.01); *H02M 3/24* (2013.01); *Y02B 70/1475* (2013.01)

(58) Field of Classification Search
CPC .............. H02M 3/24; H02M 3/33507; H02M 3/33538; H02M 3/33546; H02M 3/33553; H02M 3/33592
USPC ........ 363/15–17, 20, 21.01, 21.06, 21.14, 52, 363/53, 56.1
See application file for complete search history.

(56) References Cited

U.S. PATENT DOCUMENTS

| | | | | |
|---|---|---|---|---|
| 4,864,479 | A | * | 9/1989 | Steigerwald et al. ............ 363/17 |
| 5,343,383 | A | * | 8/1994 | Shinada et al. ............... 363/127 |
| 5,726,869 | A | * | 3/1998 | Yamashita et al. ......... 363/21.06 |
| 6,061,255 | A | * | 5/2000 | Chik et al. .................. 363/21.06 |
| 6,069,804 | A | | 5/2000 | Ingman et al. |
| 6,285,568 | B1 | * | 9/2001 | Taurand ..................... 363/21.14 |

(Continued)

FOREIGN PATENT DOCUMENTS

| | | |
|---|---|---|
| CN | 100356675 C | 12/2007 |
| CN | 101471609 B | 8/2011 |

(Continued)

OTHER PUBLICATIONS

"First Office Action" issued by the Intellectual Property Office, Ministry of Economic Affairs, R.O.C. dated Jul. 2, 2014, Taiwan.

*Primary Examiner* — Fred E Finch, III
(74) *Attorney, Agent, or Firm* — Lungtin Intellectual Property Agent Ltd.; Yunling Ren

(57) ABSTRACT

The present application provides a synchronous rectifying apparatus and a control method thereof, the apparatus comprising: a transformer, a primary circuit, a rectifying circuit, a self-driving circuit, a PWM control circuit and an auxiliary control module including at least one auxiliary control circuit and at least one auxiliary winding, wherein the auxiliary control circuit includes at least one auxiliary switch and is electrically coupled to the Pulse Width Modulation control circuit and the auxiliary winding via the auxiliary switch, and the auxiliary winding is electrically coupled to the transformer; wherein before the transfer switch of the primary circuit is controlled to be turned on by the switching control signal, the auxiliary switch is controlled to be turned on by the auxiliary control signal, and the synchronous rectifier of the rectifying circuit is controlled to be turned off through the self-driving signal.

21 Claims, 15 Drawing Sheets

(56) References Cited

U.S. PATENT DOCUMENTS

| | | | |
|---|---|---|---|
| RE37,510 E * | 1/2002 | Bowman et al. | 363/15 |
| 6,426,884 B1 * | 7/2002 | Sun | 363/17 |
| 6,473,317 B1 * | 10/2002 | Simopoulos | 363/21.06 |
| 6,678,172 B1 * | 1/2004 | Zhang et al. | 363/21.14 |
| 6,831,847 B2 * | 12/2004 | Perry | 363/21.06 |
| 6,839,246 B1 * | 1/2005 | Zhang et al. | 363/21.06 |
| 2002/0110005 A1 * | 8/2002 | Mao et al. | 363/21.06 |
| 2007/0121351 A1 * | 5/2007 | Zhang et al. | 363/21.12 |
| 2008/0130325 A1 * | 6/2008 | Ye | 363/21.14 |
| 2011/0062782 A1 * | 3/2011 | Coley et al. | 307/43 |
| 2013/0094251 A1 * | 4/2013 | Yin et al. | 363/21.06 |

FOREIGN PATENT DOCUMENTS

| | | |
|---|---|---|
| CN | 101841243 B | 1/2012 |
| TW | 201027892 A | 7/2010 |
| TW | M412573 U | 9/2011 |

* cited by examiner

SYNCHRONOUS RECTIFYING APPARATUS AND CONTROLLING METHOD THEREOF

CROSS REFERENCE TO RELATED APPLICATIONS

The present invention claims priority under 35 U.S.C. §119 to Chinese Patent Application No. 201210268727.9, filed on Jul. 30, 2012, the entire content of which is incorporated herein by reference.

TECHNICAL FIELD

The present application relates to the field of a DC-DC converter, and particularly to a synchronous rectifying apparatus and a controlling method thereof.

BACKGROUND

With the increasingly improved science and technology, the DC-DC converter is developed toward higher efficiency, higher power density, higher reliability, and higher output current and lower cost. Since a lower voltage power metallic oxide semiconductor field effect transistor (MOSFET) has a smaller on-resistance, the pressure drop is small when a current goes through the MOSFET. Therefore, the MOSFET could function as a rectifying device by replacing a diode, which greatly improves the efficiency of the DC-DC converter. When the power MOSFET is used as the rectifying device, a phase of a voltage between a gate electrode and a source electrode thereof must be kept consistent with a phase of the rectified voltage so as to realize the rectifying function, which is referred to as synchronous rectifying. The synchronous rectifying is widely applied in the DC-DC converter with a low voltage and a large current by virtue of its low conduction loss.

The synchronous rectifying may be divided into an out-driving synchronous rectifying and a self-driving synchronous rectifying depending on the driving modes. The out-driving synchronous rectifying means that driving signals of a rectifier directly comes from an external circuit, for example, a Pulse Width Modulation (PWM) control circuit. The out-driving synchronous rectifying could realize a better waveform and time sequence of the synchronous driving signal. However, the PWM control circuit is provided at the primary side, and outputs the synchronous driving signals to the secondary side for driving the rectifier on the output side. In this case, an isolation device is needed, which results in the increase of the amount of the components and the cost. The self-driving synchronous rectifying means that the voltage outputted from a transformer or an output inductor is appropriately processed and then is used to drive the rectifier. The self-driving synchronous rectifying is widely used because it needs fewer components, has a simple arrangement and a low cost, etc.

As shown in FIG. 1, the conventional self-driving synchronous rectifying apparatus includes a primary circuit having a transfer switch, a PWM control circuit, a transformer having a primary winding Wp and a secondary winding Ws, a rectifying circuit having at least one a rectifier, a filtering circuit, and a self-driving circuit. The primary circuit is electrically coupled to the primary winding Wp of the transformer and the PWM control circuit, and the rectifying circuit is electrically coupled to the secondary winding Ws of the transformer, the self-driving circuit, and the filtering circuit. Under the influence of the parasitic parameters, when the transfer switch is turned on, one rectifier in the rectifying circuit is still in on-state. At this time, another rectifier (may be a synchronous rectifier or a diode) begins to be turned on, and then a shoot-through problem will occur between the two rectifiers, thereby an instantaneous short circuit is occurred in the secondary winding Ws of the transformer, which leads to additional power loss and unnecessary electromagnetic interference, and impacts efficiency of the DC-DC converter.

SUMMARY OF THE INVENTION

In order to solve the shoot-through problem in the conventional self-driving synchronous rectifying apparatus, the present application provides a new synchronous rectifying apparatus and a controlling method thereof.

According to one aspect of the present application, there is provided a synchronous rectifying apparatus, comprising:

a transformer including a primary winding and a secondary winding;

a primary circuit including at least one transfer switch and being electrically coupled to the primary winding;

a rectifying circuit including at least one synchronous rectifier and being electrically coupled to the secondary winding;

a self-driving circuit electrically coupled to the rectifying circuit and outputting a self-driving signal;

a Pulse Width Modulation control circuit electrically coupled to the primary circuit and outputting at least one switching control signal and at least one auxiliary control signal; and an auxiliary control module including at least one auxiliary control circuit and at least one auxiliary winding, wherein the auxiliary control circuit includes at least one auxiliary switch, the auxiliary control circuit being electrically coupled to the Pulse Width Modulation control circuit and the auxiliary winding via the auxiliary switch, the auxiliary winding being electrically coupled to the transformer;

wherein before the transfer switch is controlled to be turned on by the switching control signal, the auxiliary switch is controlled to be turned on by the auxiliary control signal, and the synchronous rectifier of the rectifying circuit is controlled to be turned off through the self-driving signal.

According to another aspect of the present application, there is provided a controlling method for a synchronous rectifying apparatus, the synchronous rectifying apparatus comprising: a transformer including a primary winding and a secondary winding; a primary circuit including at least one transfer switch and being electrically coupled to the primary winding; a rectifying circuit including at least one synchronous rectifier and being electrically coupled to the secondary winding; a self-driving circuit electrically coupled to the rectifying circuit and outputting a self-driving signal; a Pulse Width Modulation control circuit electrically coupled to the primary circuit and outputting at least one switching control signal and at least one auxiliary control signal; wherein the method comprises:

providing an auxiliary control module including at least one auxiliary control circuit and at least one auxiliary winding, the auxiliary control circuit including at least one auxiliary switch, the auxiliary control circuit being electrically coupled to the Pulse Width Modulation control circuit and the auxiliary winding via the auxiliary switch, the auxiliary winding being electrically coupled to the transformer;

wherein before the transfer switch is controlled to be turned on by the switching control signal, the auxiliary switch is controlled to be turned on by the auxiliary control signal, and the synchronous rectifier of the rectifying circuit is controlled to be turned off through the self-driving signal.

The auxiliary control module is added in the conventional self-driving synchronous rectifying apparatus according to the present application, the auxiliary control module is controlled to turn off the synchronous rectifier by the PWM control circuit before the transfer switch of the primary circuit is turned on, thereby the shoot-through problem in the conventional self-driving rectifying apparatus could be efficiently solved, additional power loss and unnecessary electromagnetic interference could be avoided, and the efficiency of the DC-DC converter could be ensured.

The aforesaid and other objects, features and advantages of the disclosure will be more apparent through describing the embodiments of the present application by referring to the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. Fur purposes of clarity, not every component may be labeled in every drawing. In the drawings:

FIG. 5-1 is a schematic circuit diagram of a modified synchronous rectifying apparatus according to a second embodiment of the present application;

FIG. 5-2 is a schematic circuit diagram of another modified synchronous rectifying apparatus according to a second embodiment of the present application;

FIG. 5-3 is a schematic circuit diagram of a modified synchronous rectifying apparatus according to a second embodiment of the present application;

FIG. 5-4 is a schematic circuit diagram of another modified synchronous rectifying apparatus according to a second embodiment of the present application;

FIG. 5-5 is a schematic circuit diagram of further another modified synchronous rectifying apparatus according to a second embodiment of the present application;

FIG. 5-6 is a schematic circuit diagram of still another modified synchronous rectifying apparatus according to a second embodiment of the present application;

FIG. 6 is a schematic circuit diagram of a synchronous rectifying apparatus according to a third embodiment of the present application;

FIG. 10-1 is a schematic circuit diagram of a modified synchronous rectifying apparatus according to a seventh embodiment of the present application;

DESCRIPTION OF THE EMBODIMENTS

The embodiments of the present application will be described below by referring to the accompanying drawings. It should be noted that the embodiments described herein are only intended for illustration, but not for limiting the present application.

Figure 2:
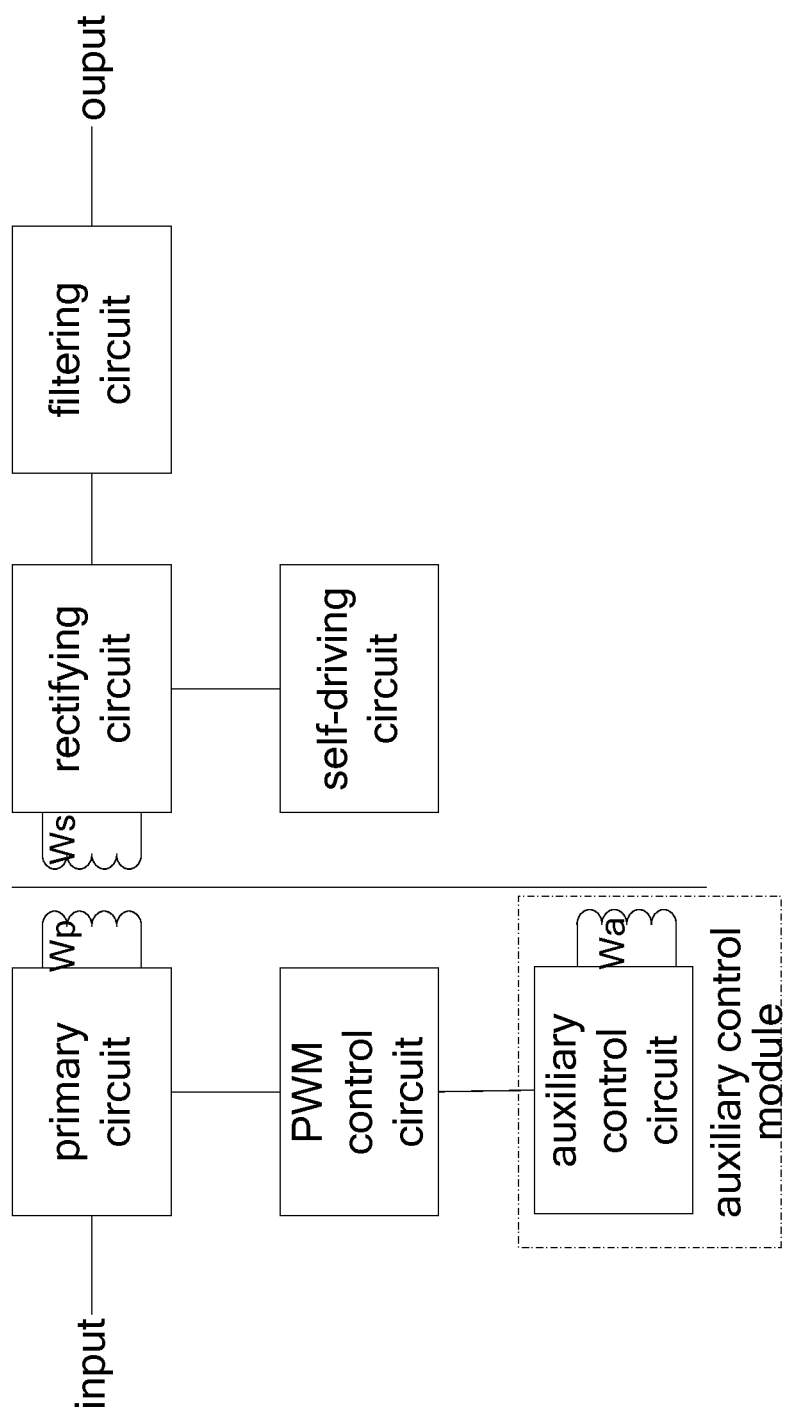
FIG. 2 is a circuit diagram of a synchronous rectifying apparatus according to an embodiment of the present application.

As shown in FIG. 2, a synchronous rectifying apparatus of the present application includes a transformer, a primary circuit, a rectifying circuit, a self-driving circuit, a Pulse Width Modulation control circuit, and an auxiliary control module. The transformer includes a primary winding Wp and a secondary winding Ws. The primary circuit includes at least one transfer switch and is electrically coupled to the primary winding Wp of the transformer. The rectifying circuit includes at least one synchronous rectifier and is electrically coupled to the secondary winding Ws of the transformer. The self-driving circuit is electrically coupled to the rectifying circuit and outputs a self-driving signal. The Pulse Width Modulation control circuit is electrically coupled to the primary circuit and outputs at least one switching control signal and at least one auxiliary control signal. The auxiliary control module includes at least one auxiliary control circuit and at least one auxiliary winding Wa, wherein the auxiliary control circuit includes at least one auxiliary switch, and is electrically coupled to the Pulse Width Modulation control circuit and the auxiliary winding Wa via the auxiliary switch, and the auxiliary winding Wa is electrically coupled to the transformer. A control terminal of the auxiliary switch is electrically coupled to an output terminal of the Pulse Width Modulation (PWM) control circuit, and receives the auxiliary control signal outputted from the output terminal of the PWM control circuit. The auxiliary control module is turned on or off according to the auxiliary control signal, i.e. when a voltage between two sides of the auxiliary winding Wa satisfies a certain condition and the auxiliary switch is turned on, the auxiliary control module is in an on-state; and when the auxiliary switch is turned off, the auxiliary control module is in off-state. The transfer switch of the primary circuit receives the switching control signal outputted from the PWM control circuit via a control terminal thereof, and is turned on or off according to the switching control signal. Before the transfer switch is turned on according to the switching control signal, the PWM control circuit outputs the auxiliary control signal to turn on the auxiliary switch, and thus the voltage between two sides of the auxiliary winding Wa drops to zero. The self-driving signal outputted from the self-driving circuit drops to zero by coupling with the transformer, thereby the synchronous rectifier of the rectifying circuit is turned off such that the shoot-through problem in the synchronous rectifying apparatus, additional power loss and unnecessary EMI may be eliminated, and the efficiency of the DC-DC converter can be ensured. It is noted that the synchronous rectifier of the present application includes an ideal MOS tube and a body-diode. Accordingly, turning off the synchronous rectifier means only turning off the ideal MOS tube, not involving the body-diode.

The embodiments of the present application will be described below by referring to the accompanying drawings.

First Embodiment

Figure 3:
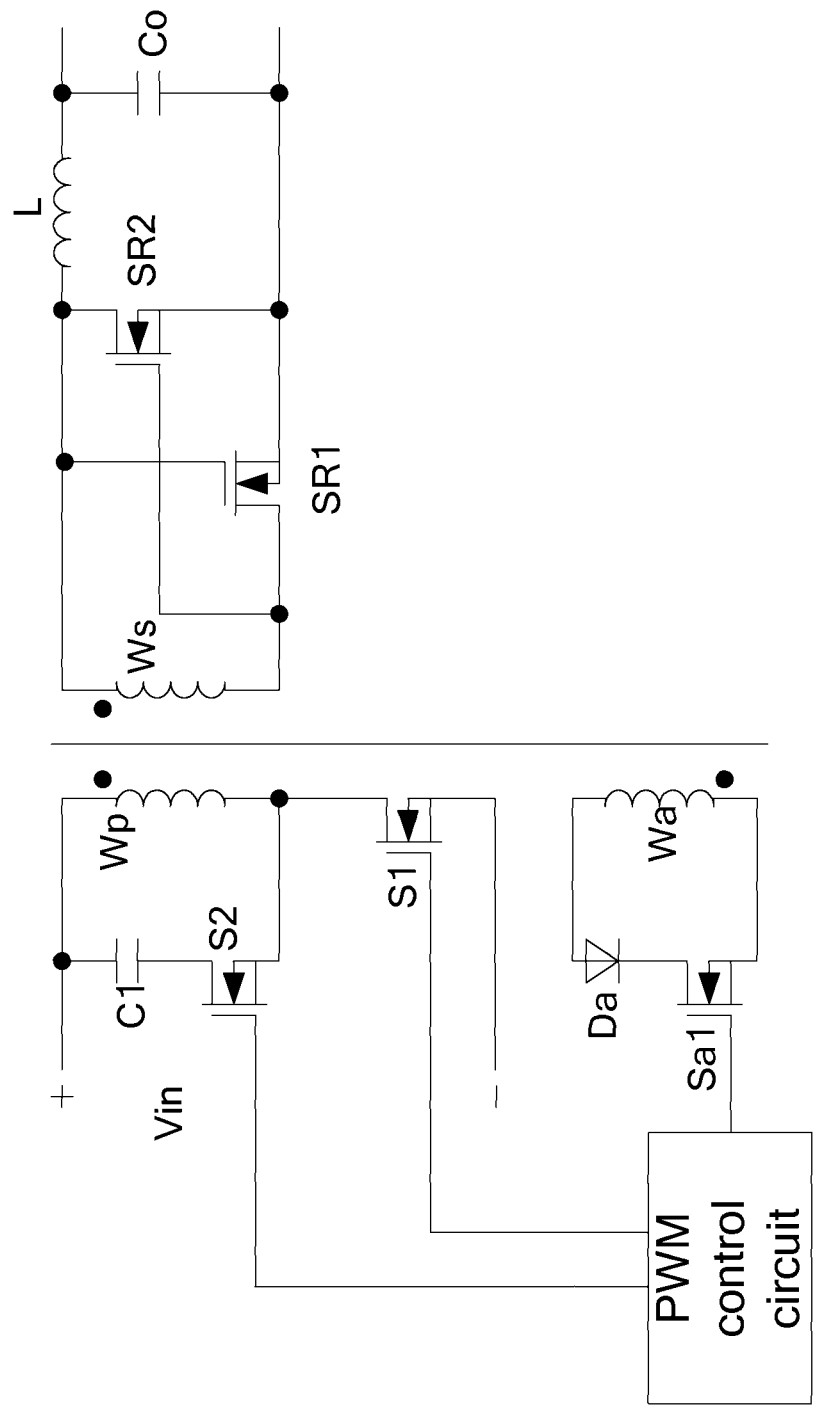
FIG. 3 is a schematic circuit diagram of a synchronous rectifying apparatus according to a first embodiment of the present application.

FIG. 3 shows a synchronous rectifying apparatus according to the present embodiment. The apparatus includes a transformer having a primary winding Wp and a secondary winding Ws, a primary circuit having a reset switch S2, a capacitor C1 and a transfer switch S1, a PWM control circuit, a rectifying circuit having a first synchronous rectifier SR1 and a second synchronous rectifier SR2, a filtering circuit having a filtering inductor L and an output capacitor Co, and an auxiliary control module having an auxiliary winding Wa, a diode Da and a first auxiliary switch Sa1. The diode Da and the first auxiliary winding Sa1 constitute an auxiliary control circuit. In the present embodiment, the secondary winding Ws not only supplies electric energy to the rectifying circuit on the secondary side, but also functions as a self-driving circuit which outputs a self-driving signal to the first synchronous rectifier SR1 and the second synchronous rectifier SR2. Control terminals of the reset switch S2 and the transfer switch S1 in the primary circuit are respectively electrically coupled to an output terminal of the PWM control circuit, a second terminal of the reset switch S2 and a first terminal of the transfer switch S1 are electrically coupled to a second terminal (i.e. a non-dotted terminal) of the primary winding Wp, a first terminal of the reset switch S2 is electrically coupled to a first output terminal (i.e. a positive electrode) of a power supply and a first terminal (i.e. a dotted terminal) of the primary winding Wp via the capacitor C1, and a second terminal of the transfer switch S1 is electrically coupled to a second output terminal (i.e. a negative electrode) of the power supply. A first terminal of the first synchronous rectifier SR1 is electrically coupled to a control terminal of the second synchronous rectifier SR2 and a second terminal (i.e. a non-dotted terminal) of the secondary winding Ws, a first terminal of the second synchronous rectifier SR2 is electrically coupled to an control terminal of the first synchronous rectifier SR1 and a first terminal of a secondary winding Ws (i.e. a dotted terminal), and a second terminal of the first synchronous rectifier SR1 and a second terminal of the second synchronous rectifier SR2 are electrically coupled to each other. One terminal of the filtering inductor L is electrically coupled to the first terminal of the second synchronous rectifier SR2, and the other terminal of the filtering inductor L is electrically coupled to the second terminal of the first synchronous rectifier SR1 and the second terminal of the second synchronous rectifier SR2 via the output capacitor Co. A control terminal of the first auxiliary switch Sa1 in the auxiliary control circuit is electrically coupled to an output terminal of the PWM control circuit to receive an auxiliary control signal, a first terminal of the first auxiliary switch Sa1 is electrically coupled to a cathode of the diode Da, a second terminal of the first auxiliary switch Sa1 is electrically coupled to a first terminal (i.e. a dotted terminal) of the auxiliary winding Wa, and an anode of the diode Da is electrically coupled to a second terminal (i.e. a non-dotted terminal) of the auxiliary winding Wa. The auxiliary winding Wa is electrically coupled to the transformer, and is homocentric with the primary winding Wp and the secondary winding Ws. The first auxiliary switch Sa1 may be a transistor, a PMOS tube, or a NMOS tube, and the like. The first auxiliary switch Sa1 receives the auxiliary control signal outputted from the output terminal of the PWM control circuit via the control terminal thereof, and the first auxiliary switch Sa1 is controlled by the auxiliary control signal to be turned on or off. The auxiliary control signal may be a periodic control signal or a non-periodic control signal. The reset switch S2 receives a reset control signal outputted from the PWM control circuit via the control terminal thereof, and is controlled by the reset control signal to be turned on or off. The transfer switch S1 receives a switching control signal outputted from the output terminal of the PWM control circuit via the control terminal thereof, and is controlled by the switching control signal to be turned on or off. It should be pointed out that the first terminal of the primary winding, the first terminal of the secondary winding, the first terminal of the auxiliary winding, a first terminal of a first winding, a first terminal of a second winding, a first terminal of a third winding, and a first terminal of a fourth winding described in the present application are dotted terminals, and the second terminals of the aforesaid windings are not-dotted terminals.

Figure 4:
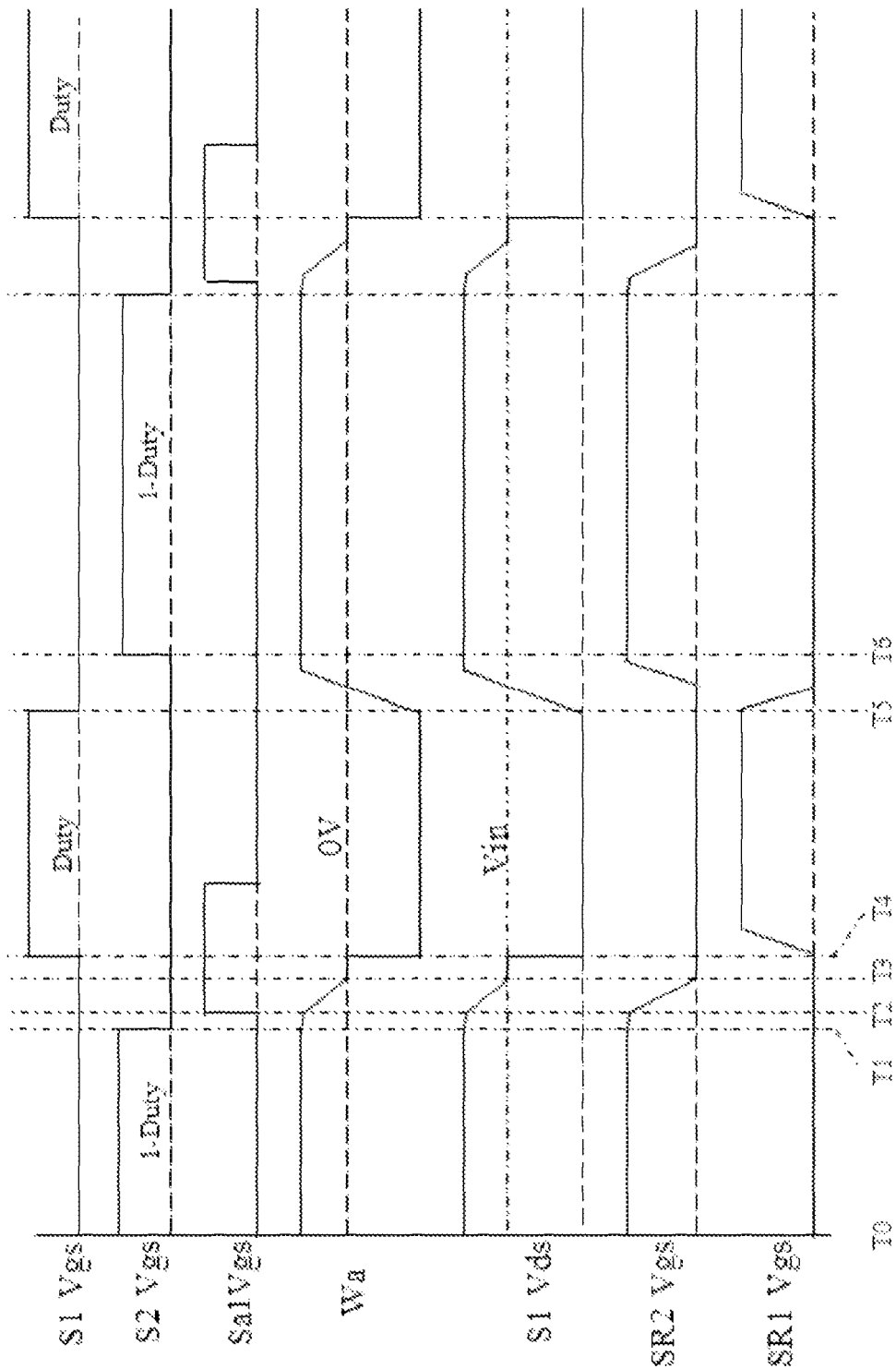
FIG. 4 is a working waveform sequence diagram of the synchronous rectifying apparatus shown in FIG. 3.

FIG. 4 shows a working waveform diagram of the apparatus shown in FIG. 3.

T0-T1: in a 1-Duty period, the transformer is in a reset stage. At this time, the transfer switch S1 is turned off, the reset switch S2 is turned on (i.e. the PWM control circuit outputs a reset control signal S2 Vgs to the reset switch S2 so as to control the reset switch S2 to be turned on), the primary winding Wp has a positive voltage on the lower terminal and a negative voltage on the upper terminal, the secondary winding Ws has a positive voltage on the lower terminal and a negative voltage on the upper terminal, the self-driving circuit outputs the self-driving signal to control the first synchronous rectifier SR1 to be turned off and control the second synchronous rectifier SR2 to be turned on. The auxiliary winding Wa has a positive induced voltage on the upper terminal and a negative induced voltage on the lower terminal, and the first auxiliary switch Sa1 is in off-state.

T1-T2: at T1, the PWM control circuit outputs the reset control signal to the reset switch S2 to turn off the reset switch S2. At this time, the primary winding Wp has a positive voltage on the lower terminal and a negative voltage on the upper terminal, the secondary winding Ws has a positive voltage on the lower terminal and a negative voltage on the upper terminal, and the auxiliary winding Wa has a positive voltage on the upper terminal and a negative voltage on the lower terminal. The voltage Vds between the first terminal and the second terminal of the transfer switch S1 drops slowly under an exciting current of the transformer, the voltage value between two sides of the primary winding Wp drops slowly, and the voltage between two sides of the secondary winding Ws also drops slowly, thereby the voltage SR2 Vgs between the control terminal and the second terminal of the second synchronous rectifier SR2 drops slowly under a parasitic capacitor, and the first synchronous rectifier SR1 is still in off-state.

T2-T3: at T2, the PWM control circuit outputs an auxiliary control signal Sa1 Vgs via its output terminal to the first auxiliary switch Sa1 to control the first auxiliary switch Sa1 to be turned on. At this time, the auxiliary control module is conducted, thus the voltage between two sides of the auxiliary winding Wa drops fast, and then the voltages between two sides of the primary winding Wp of the transformer and between two sides of the secondary winding Ws of the transformer drop fast. Furthermore, the voltage S1 Vds between the first terminal and the second terminal of the transfer switch S1 and the voltage SR2 Vgs between the control terminal and the second terminal of the secondary synchronous rectifier SR2 also drop fast at the same time until the voltage S1 Vds between the first terminal and the second terminal of the transfer switch S1 drops to a power supply voltage Vin, and the voltage SR2 Vgs between the control terminal and the second terminal of the secondary synchronous rectifier SR2 drops to 0V.

T3-T4: at T3, the voltage SR2 Vgs between the control terminal and the second terminal of the second synchronous rectifier SR2 drops to 0V, i.e. the second synchronous rectifier SR2 is in off-state. The voltage between two sides of the auxiliary winding Wa keeps to be 0V, the voltage S1 Vds between the first terminal and second terminal of the transfer switch S1 keeps to be the power supply voltage Vin, and the voltage SR2 Vgs between the control terminal and the second terminal of the second synchronous rectifier SR2 keeps to be 0V.

T4-T5: at T4, the PWM control circuit outputs a switching control signal S1 Vgs to the transfer switch S1 so as to control the transfer switch S1 to be turned on. At this time, the self-driving circuit outputs the self-driving signal to control the first synchronous rectifier SR1 to be turned on. In Duty period, the second synchronous rectifier SR2 is in off-state, the primary winding Wp has a positive voltage on the upper terminal and a negative voltage on the lower terminal, the secondary winding Ws has a positive voltage on the upper terminal and a negative voltage on the lower terminal, and the auxiliary winding Wa has a positive voltage on the lower terminal and a negative voltage on the upper terminal.

T5-T6: at T5, the PWM control circuit outputs the switching control signal to the transfer switch S1 to control the transfer switch S1 to be turned off. At this time, the voltage SR1 Vgs between the control terminal and the second terminal of the first synchronous rectifier SR1 begins to slowly drop to 0V, and the first synchronous rectifier SR1 is in off-state. When the first synchronous rectifier SR1 is turned off, the second synchronous rectifier SR2 is controlled by the self-driving signal outputted from the self-driving circuit to be turned on. At T6, the reset switch S2 is turned on. Before T6 (i.e. before the reset switch S2 is turned on), the first auxiliary switch Sa1 is turned off, thereby a short circuit of the transformer, which may be occurred if the reset switch S2 and the first auxiliary switch Sa1 are turned on simultaneously, could be avoided. After T6, the next Duty circle starts.

It can be seen from FIGS. 3-4 that the PWM control circuit controls the first auxiliary switch Sa1 of the auxiliary control circuit to be turned on after the reset switch S2 is turned off, thereby a current path is formed in the auxiliary control module. The voltage of the secondary winding Ws of the transformer, and then the self-driving circuit is controlled by the electrical coupling relation between the auxiliary winding Wa and the secondary winding Ws of the transformer. Before the transfer switch S1 is controlled to be turned on by the switching control signal outputted from the PWM control circuit, both of the first synchronous rectifier SR1 and second synchronous rectifier SR2 are controlled to be in off-state by the self-driving signal outputted from the self-driving circuit based on the electrical coupling relation between the self-driving circuit and the auxiliary winding. The PWM control circuit controls the first auxiliary switch Sa1 of the auxiliary control circuit to be turned off before the reset switch S2 is turned on so as to prevent the short circuit in the transformer in case that the reset switch S2 and the first auxiliary switch Sa1 are simultaneously turned on.

In the present embodiment, a forward converter is used as the primary circuit. However, it should be understood by those skilled in the art that the primary circuit may be a bridge circuit or other equivalent circuits.

In the present application, an auxiliary control module is added in the conventional self-driving synchronous rectifying apparatus, and an auxiliary switch of an auxiliary control circuit in the auxiliary control module is controlled to be turned on or turned off by the auxiliary control signal outputted from the PWM control circuit so that a current path is formed or not formed in the auxiliary control module. Before the transfer switch of the primary circuit is turned on, the synchronous rectifier may be controlled to be turned off through the self-driving signal outputted from the self-driving circuit based on the current path formed in the auxiliary control module, thereby the shoot-through problem in the conventional self-driving rectifying apparatus could be efficiently solved, additional power loss and unnecessary electromagnetic interference could be avoided, and the efficiency of the DC-DC converter could be ensured.

Second Embodiment

Figure 1:
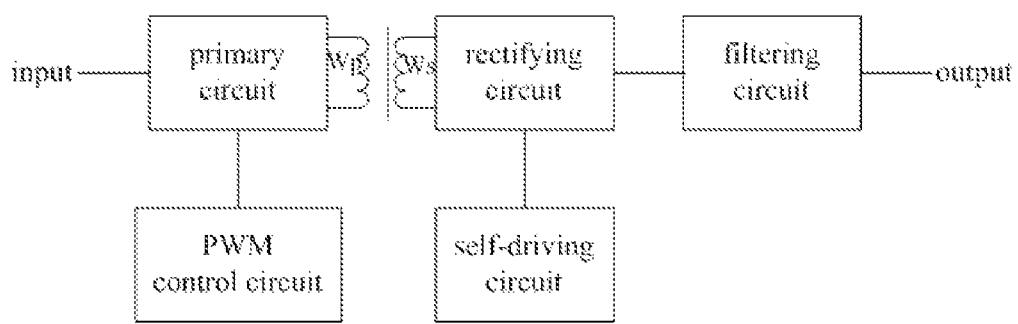
FIG. 1 is a circuit diagram of a conventional self-driving synchronous rectifying apparatus.
Figure 5:
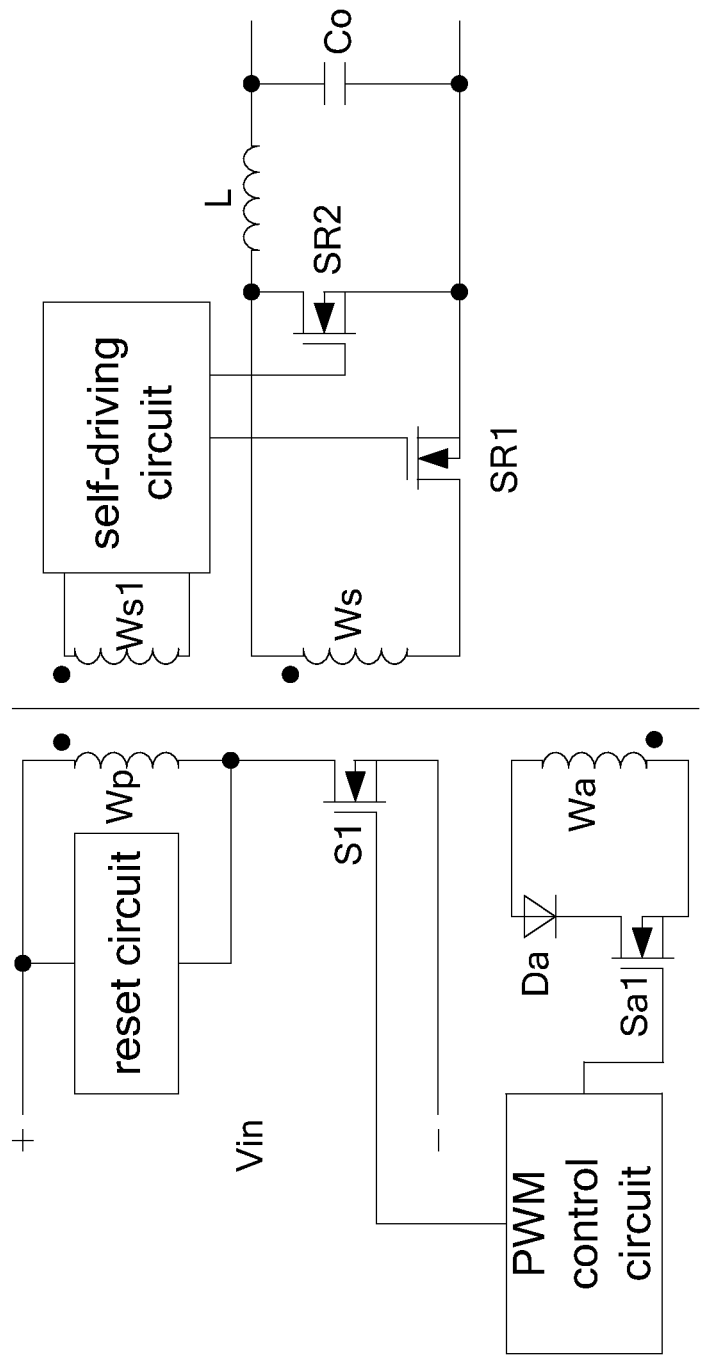
FIG. 5 is a schematic circuit diagram of a synchronous rectifying apparatus according to a second embodiment of the present application.
Figures 1, 5:
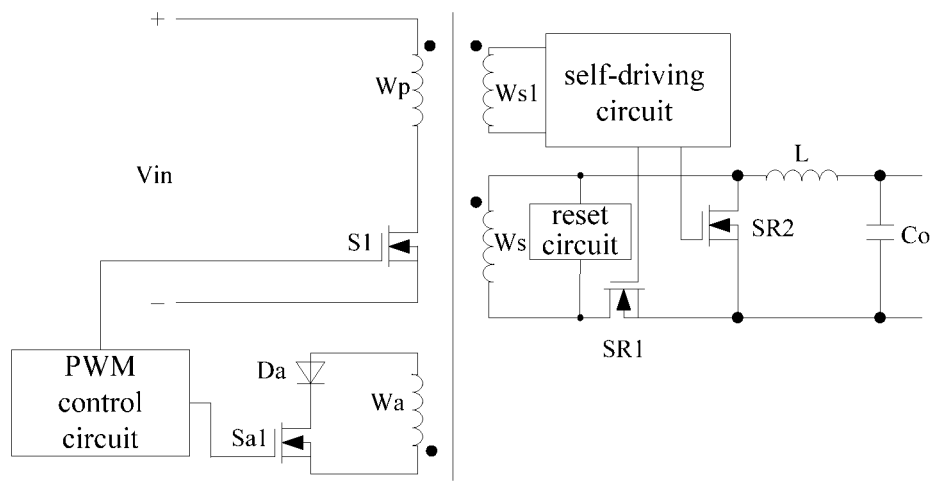
Figures 2, 5:
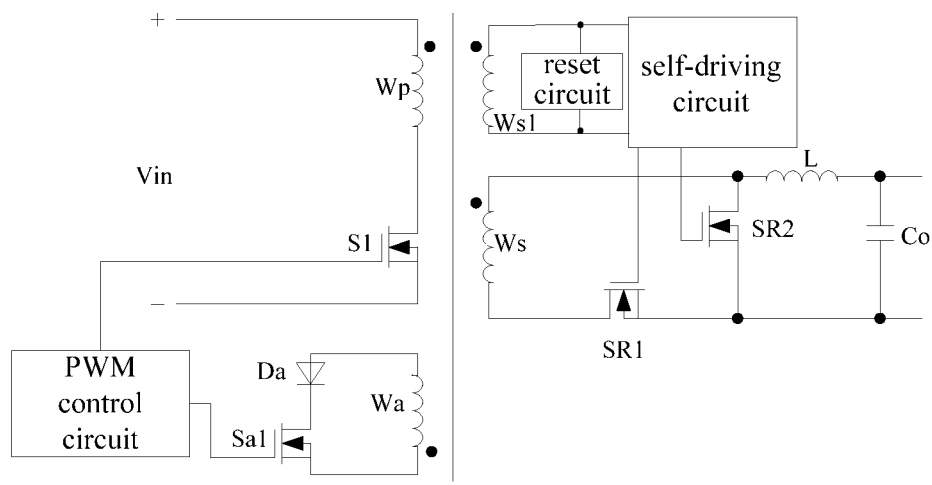
Figures 3, 5:
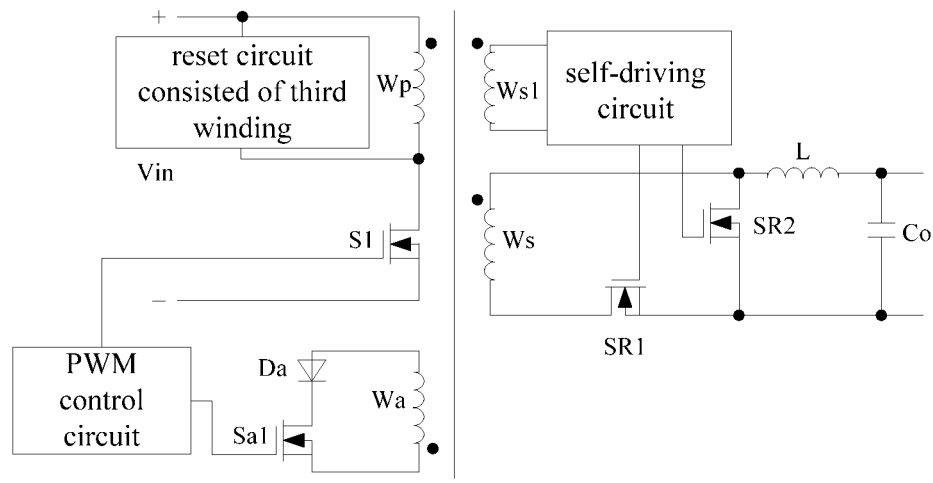
Figures 4, 5:
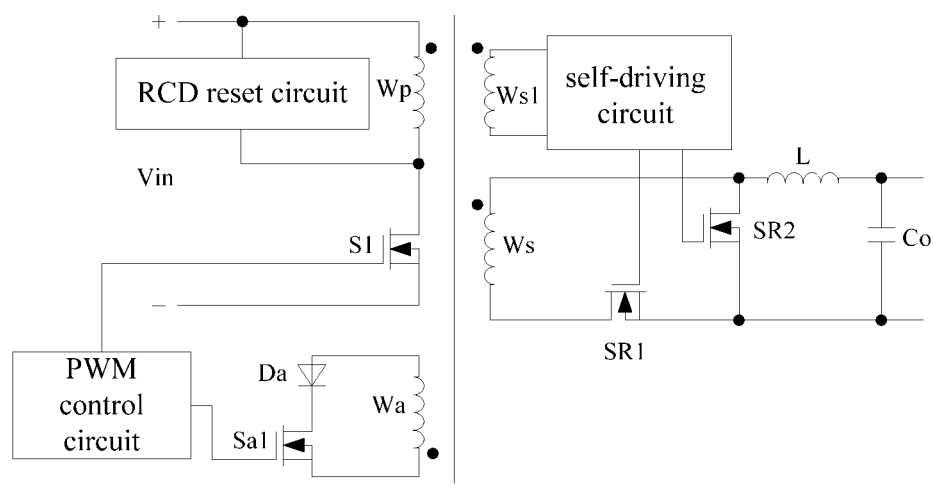
Figure 5:
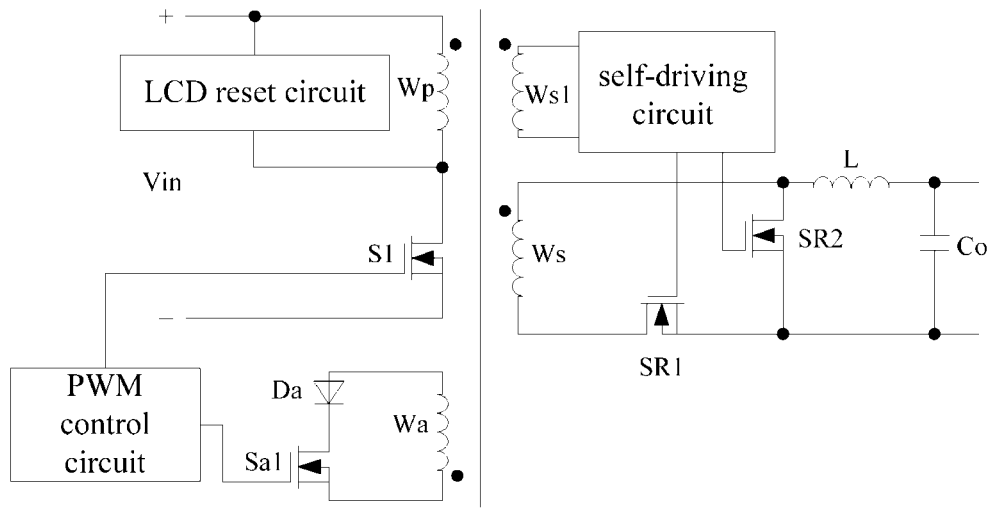

In the first embodiment, the secondary winding Ws not only supplies electric energy to the rectifying circuit, but also functions as the self-driving circuit for providing the self-driving signal to the first synchronous rectifier SR1 and the second synchronous rectifier SR2. As shown in FIG. 5, different from the first embodiment, the transformer in the present embodiment further includes another secondary winding Ws1 which is used as the self-driving circuit for providing a self-driving signal to the first synchronous rectifier SR1 and the second synchronous rectifier SR2. A first terminal of the first synchronous rectifier SR1 is electrically coupled to a second terminal of a secondary winding Ws, a second terminal of the first synchronous rectifier SR1 is connected with a second terminal of the second synchronous rectifier SR2, and a control terminal of the first synchronous rectifier SR1 is electrically coupled to the self-driving circuit. A first terminal of the second synchronous rectifier SR2 is electrically coupled to a first terminal of the secondary winding Ws, and a control terminal of the second synchronous rectifier SR2 is also electrically coupled to the self-driving circuit. The first synchronous rectifier SR1 and the second synchronous rectifier SR2 are controlled to be turned off and on through the self-driving signal outputted from the self-driving circuit. Additionally, a filter inductor L may be used as the self-driving circuit for providing the self-driving signal to the first synchronous rectifier SR1 and the second synchronous rectifier SR2. In addition, in the apparatus shown in FIG. 5, the reset circuit may be the reset circuit consisted of the reset switch S2 and the capacitor C1 shown in FIG. 3, whereas the reset circuit may be other types of reset circuits, for example, a Resistor-Capacitor-Diode (RCD) reset circuit (see FIG. 5-4), a reset circuit consisted of a third winding (see FIG. 5-3), an Inductor-Capacitor-Diode (LCD) reset circuit (see FIG. 5-5), a resonant reset circuit (see FIG. 5-6), and the like. The reset circuit may be bridged over two sides of the primary winding Wp of the transformer, or over two sides of the secondary winding Ws (see FIG. 5-1), or between a first terminal and a second terminal of the transfer switch of the primary circuit, or over two sides of an additional winding which is electrically coupled to the transformer and is homocentric with the primary winding Wp and the secondary winding Ws (see FIG. 5-2). The working waveform diagram of the synchronous rectifying apparatus according to the present embodiment may refer to the first embodiment, and no more details will be given herein.

Third Embodiment

Figures 5, 6:
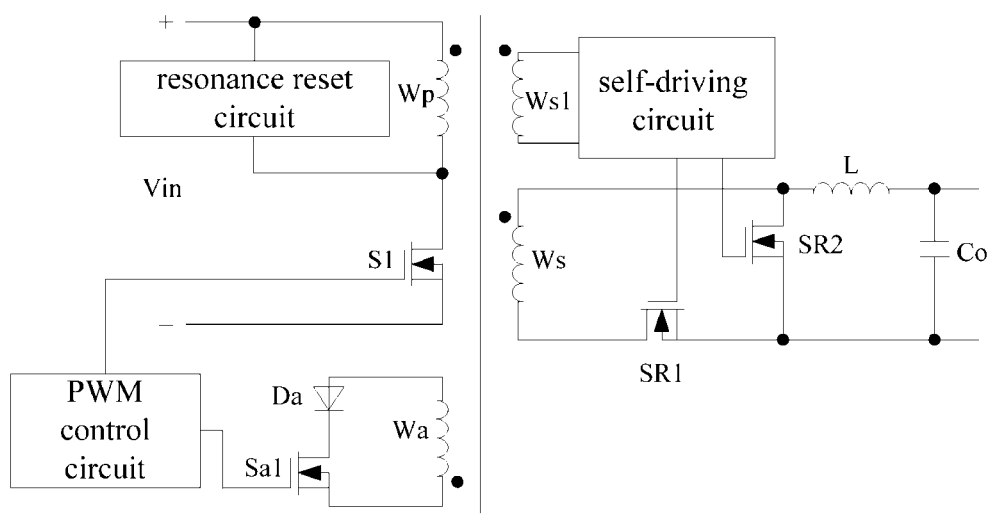
Figure 6:
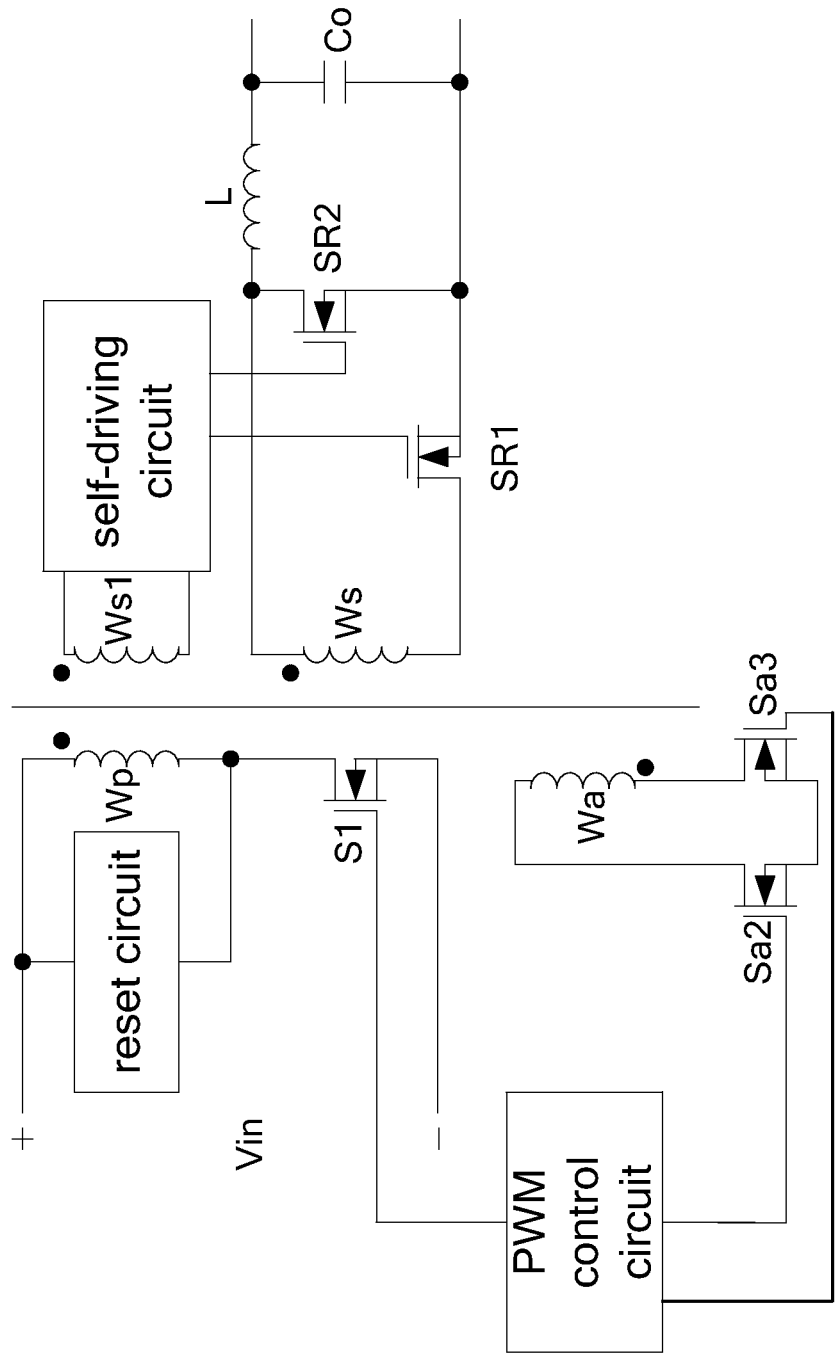

As shown in FIG. 6, different from the second embodiment, the auxiliary control module of the synchronous rectifying apparatus according to the present embodiment includes an auxiliary winding Wa, a second auxiliary switch Sa2 and a third auxiliary switch Sa3, wherein the second auxiliary switch Sa2 and the third auxiliary switch Sa3 constitute an auxiliary control circuit. The auxiliary winding Wa is electrically coupled to a transformer and is homocentric with a primary winding Wp and a secondary winding Ws. A control terminal of the second auxiliary switch Sa2 is electrically coupled to one output terminal of the PWM control circuit to receive the auxiliary control signal, a first terminal of the second auxiliary switch Sa2 is electrically coupled to a second terminal (i.e. the non-dotted terminal) of the auxiliary winding Wa, a first terminal of the third auxiliary switch Sa3 is electrically coupled to a first terminal (i.e. the dotted terminal) of the auxiliary winding Wa, a second terminal of the third auxiliary switch Sa3 is electrically coupled to a second terminal of the second auxiliary switch Sa2, and a control terminal of the third auxiliary switch Sa3 is electrically coupled to another output terminal of the PWM control circuit. The control terminals of the second auxiliary switch Sa2 and the third auxiliary switch Sa3 receive the auxiliary control signal outputted from the output terminals of the PWM control circuit, and the auxiliary control signal may be a periodic control signal or a non-periodic control signal. The PWM control circuit controls the second auxiliary switch Sa2 to be turned on via the outputted auxiliary control signal so that the second synchronous rectifier SR2 is turned off in time before the transfer switch S1 is turned on. When the synchronous rectifying apparatus is shut down, the PWM control circuit controls the second auxiliary switch Sa2 and the third auxiliary switch Sa3 to be simultaneously turned on, thereby both of the first synchronous rectifier SR1 and the second synchronous rectifier SR2 are controlled to be turned off through the self-driving signal outputted from the self-driving circuit, and thus, the shoot-through in the synchronous rectifying apparatus could be efficiently solved, and additional power loss and unnecessary electromagnetic interference could be avoided. The working waveform diagram of the synchronous rectifying apparatus may refer to the first embodiment, and no more details will be given herein, wherein the working waveform diagram of the second auxiliary switch Sa2 is consistent with the working waveform diagram of the first auxiliary switch Sa1.

Fourth Embodiment

Figure 7:
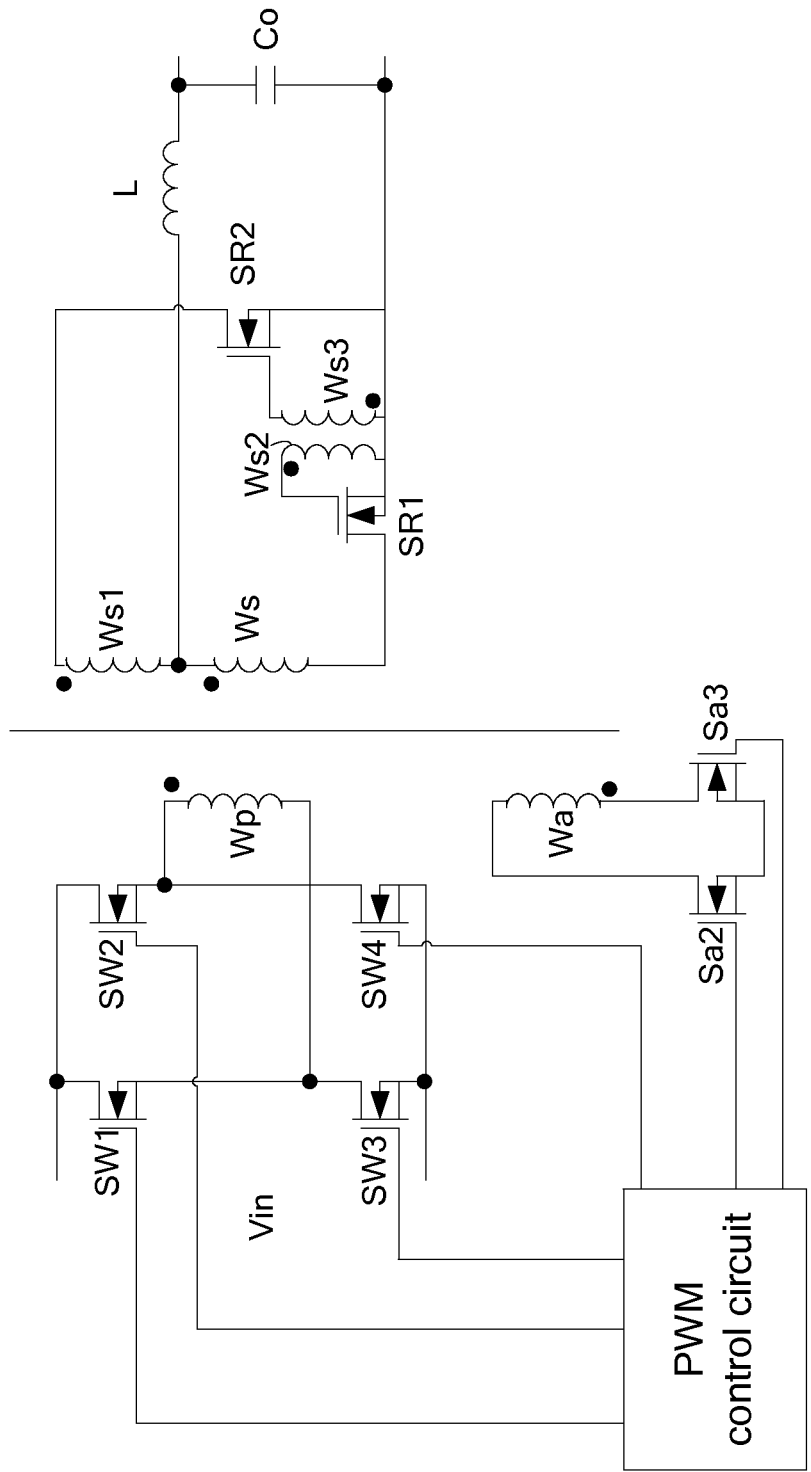
FIG. 7 is a schematic circuit diagram of a synchronous rectifying apparatus according to a fourth embodiment of the present application.

As shown in FIG. 7, different from the apparatuses shown in FIGS. 3, 5 and 6, in the apparatus according to the present embodiment, a full-bridge circuit is adopted as the primary circuit, which is composed of a transfer switch SW1 (i.e. a first transfer switch), a transfer switch SW2 (i.e. a second transfer switch), a transfer switch SW3 (i.e. a third transfer switch) and a transfer switch SW4 (i.e. a fourth transfer switch). A first terminal of the transfer switch SW1 is electrically coupled to a first terminal of the transfer switch SW2 and a first output terminal of a power supply, a second terminal of the transfer switch SW1 is electrically coupled to a first terminal of the transfer switch SW3, a second terminal of the transfer switch SW2 is electrically coupled to a first terminal of the transfer switch SW4, a second terminal of the transfer switch SW3 is electrically coupled to a second terminal of the transfer switch SW4 and a second output terminal of the power supply, the control terminals of the transfer switch SW1, the transfer switch SW2, and the transfer switch SW3 and the transfer switch SW4 are respectively electrically coupled to the output terminal of a PWM control circuit to receive a switching control signal. A first terminal of a primary winding Wp is electrically coupled to a common point between the second terminal of the transfer switch SW2 and the first terminal of the transfer switch SW4, and a second terminal of the primary winding Wp is electrically coupled to a common point between the second terminal of the transfer switch SW1 and the first terminal of the transfer switch SW3. It shall be pointed out that the primary circuit may also adopt a half-bridge circuit which bridges between the first output terminal and the second output terminal of the power supply. The synchronous rectifying apparatus further includes a first winding Ws1, a second winding Ws2, and a third winding Ws3, which are electrically coupled to the power supply and are homocentric with the primary winding Wp and the secondary winding Ws. The second winding Ws2 and the third winding Ws3 constitute a self-driving circuit for supplying a self-driving signal to the first synchronous rectifier SR1 and the second synchronous rectifier SR2. A first terminal of the second synchronous tube SR2 is electrically coupled to a first terminal of the secondary winding Ws via the first winding Ws1, a second terminal of the second synchronous rectifier SR2 is electrically coupled to a first terminal of the second winding Ws3, a second terminal of the second winding Ws2 and a second terminal of the first synchronous rectifier SR1, and a control terminal of the second synchronous rectifier SR2 is electrically coupled to a second terminal of the third winding Ws3. A first terminal of the first synchronous rectifier SR1 is electrically coupled to a second terminal of the secondary winding Ws, and a control terminal of the first synchronous rectifier SR1 is electrically coupled to a first terminal of the second winding Ws2. One terminal of a filtering inductor L is electrically coupled to the first terminal of the secondary winding Ws of the transformer, and the other terminal of the filtering inductor L is electrically coupled to the second terminal of the second synchronous rectifier SR2, the first terminal of the third winding Ws3, the second terminal of the second winding Ws2, and the second terminal of the first synchronous rectifier SR1 via an output capacitor Co. The auxiliary control module includes an auxiliary winding Wa, a second auxiliary switch Sa2, and a third auxiliary switch Sa3, wherein the second auxiliary switch Sa2 and the third auxiliary switch Sa3 constitute an auxiliary control circuit. The auxiliary winding Wa is electrically coupled to the transformer. The control terminals of the second auxiliary switch Sa2 and the third auxiliary switch Sa3 are electrically coupled to the output terminals of the PWM control circuit, a second terminal of the second auxiliary switch Sa2 is electrically coupled to a second terminal of the third auxiliary switch Sa3, a first terminal of the second auxiliary switch Sa2 is electrically coupled to a second terminal of the auxiliary winding Wa, and a first terminal of the third auxiliary switch Sa3 is electrically coupled to a first terminal of the auxiliary winding Wa. The auxiliary winding Wa is homocentric with the primary winding Wp and the secondary winding Ws. The second auxiliary switch Sa2 and the third auxiliary switch Sa3 may be PMOS tubes or a NMOS tubes. Taking the NMOS tube for example, the PWM control circuit controls the transfer switch SW1, the transfer switch SW2, the transfer switch SW3, and the transfer switch SW4 to be turned on and off via the outputted switching control signal, and controls the second auxiliary switch Sa2 and the third auxiliary switch Sa3 to be turned on and off via the outputted auxiliary control signal. When the transfer switch SW2 and the transfer switch SW3 in the primary circuit are turned off, the third auxiliary switch Sa3 of the auxiliary control circuit is controlled to be turned on through the auxiliary control signal outputted from the PWM control circuit before the transfer switch SW1 and the transfer switch SW4 are turned on, thereby the first synchronous rectifier SR1 is turned off in time. Identically, when the transfer switch SW1 and the transfer switch SW4 are turned off, the second auxiliary switch Sa2 of the auxiliary control circuit is controlled to be turned on through the auxiliary control signal outputted from the PWM control circuit before the transfer switch SW2 and the transfer switch SW3 are turned on, thereby the second synchronous rectifier SR2 could be turned off in time. The working waveform diagram of the apparatus according to the present embodiment is similar to the working waveform diagram of the apparatus according to the first embodiment, and thus no more details will be given herein. When the synchronous rectifying apparatus is shut down, the PWM control circuit controls both of the second auxiliary switch Sa2 and the third auxiliary switch Sa3 to be simultaneously turned on so that both of the first synchronous rectifying apparatus SR1 and the second synchronous rectifying apparatus SR2 are controlled to be turned off by the self-driving signal outputted from the self-driving circuit, and thus, the shoot-through problem in the synchronous rectifying apparatus could be efficiently solved, and additional power loss and unnecessary electromagnetic interference could be avoided.

Fifth Embodiment

Figure 8:
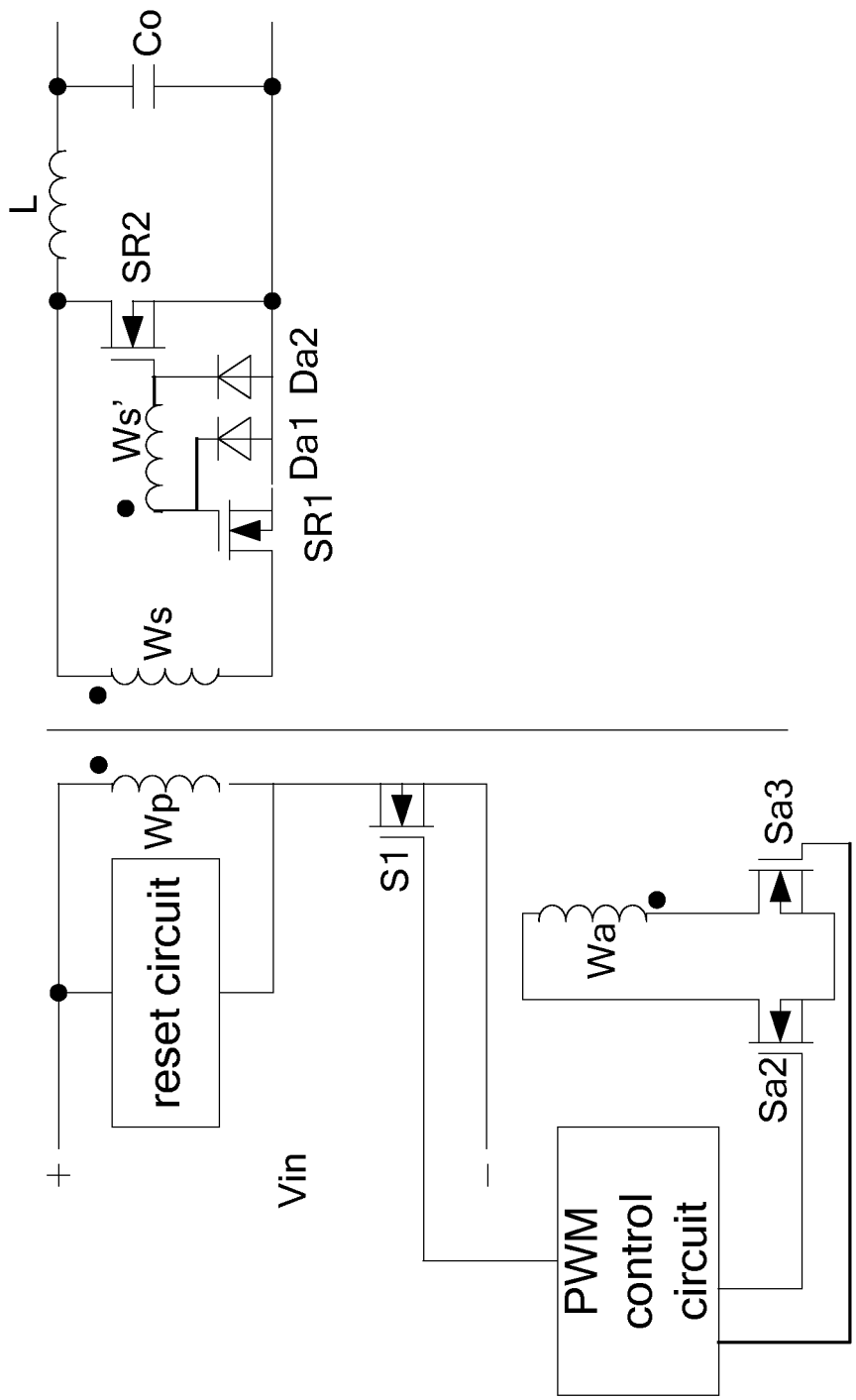
FIG. 8 is a schematic circuit diagram of a synchronous rectifying apparatus according to a fifth embodiment of the present application.

The synchronous rectifying apparatus shown in FIG. 8 may be regarded as an embodied schematic circuit diagram of the synchronous rectifying apparatus shown in FIG. 6. In the apparatus shown in FIG. 8, a fourth winding Ws', a first diode Da1, and a second diode Da2 constitute the self-driving circuit for supplying a self-driving signal to the first synchronous rectifier SR1 and the second synchronous rectifier SR2, wherein the fourth winding Ws' is electrically coupled to a transformer, and is homocentric with a primary winding Wp and a secondary winding Ws.

A first terminal of the fourth winding Ws' is electrically coupled to a control terminal of the first synchronous rectifier SR1 and a cathode of the first diode Da1, a second terminal of the fourth winding Ws' is electrically coupled to a control terminal of the second synchronous rectifier SR2 and a cathode of the second diode Da2, an anode of the first diode Da1 and an anode of the second diode Da2 are electrically coupled to a second terminal of the first synchronous rectifier SR1 and a second terminal of the second synchronous rectifier SR2, a first terminal of the first synchronous rectifier SR1 is electrically coupled to a second terminal of the secondary winding Ws, and a first terminal of the second synchronous rectifier SR2 is electrically coupled to a first terminal of the secondary winding Ws. The components, coupling relations and working modes of the auxiliary control module may refer to FIG. 6, and no more details will be given herein. The working waveform diagrams of the first synchronous rectifier SR1 and the second synchronous rectifier SR2 may refer to the first embodiment, and no more details will be given herein. The second auxiliary switch Sa2 and/or the third auxiliary switch Sa3 of the auxiliary control circuit in the auxiliary control module are controlled to be turned on by the PWM control circuit, thereby the second synchronous rectifier SR2 and/or the first synchronous rectifier SR1 are turned off. Thus, the shoot-through problem in the synchronous rectifying apparatus could be efficiently solved, and additional power loss and unnecessary electromagnetic interference could be avoided.

Sixth Embodiment

Figure 9:
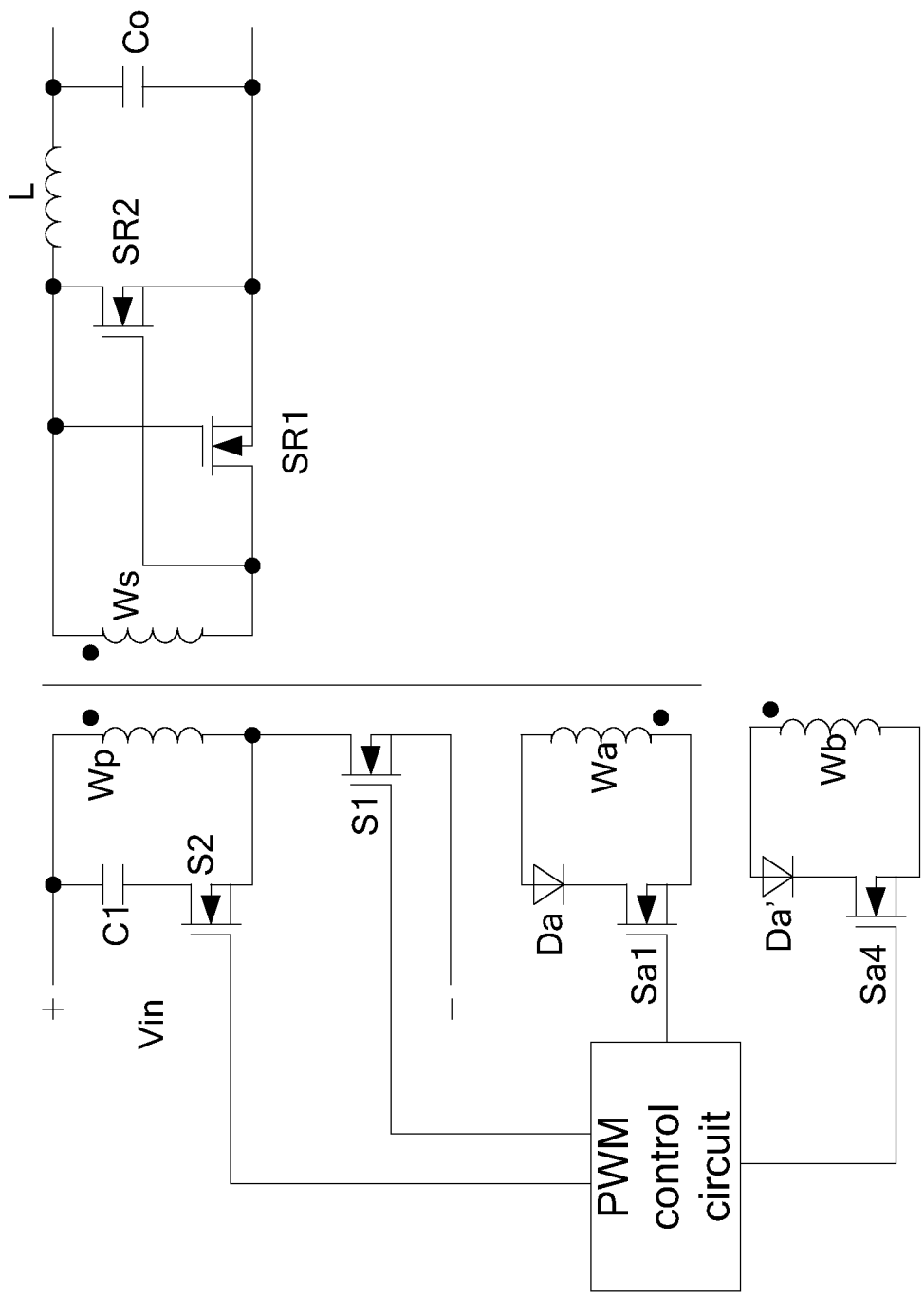
FIG. 9 is a schematic circuit diagram of a synchronous rectifying apparatus according to a sixth embodiment of the present application.

As shown in FIG. 9, different from the apparatus shown in FIG. 3, a synchronous rectifying apparatus according to the present embodiment includes another auxiliary control circuit and another auxiliary winding Wb. The another auxiliary control circuit includes a diode Da' and a fourth auxiliary switch Sa4. In the present embodiment, for convenience of description, an auxiliary winding Wa, a diode Da, and a first auxiliary switch Sa1 constitute a first auxiliary control module, the diode Da and the first auxiliary switch Sa1 constitute a first auxiliary control circuit, the auxiliary winding Wa is referred to as a first auxiliary winding; the another auxiliary control circuit is referred to as a second auxiliary control circuit, the another auxiliary winding Wb is referred to as a second auxiliary winding, the second auxiliary control circuit and the second auxiliary winding constitute a second auxiliary control module. The fourth switch Sa4 has a first terminal, a second terminal and a control terminal. The control terminal of the fourth switch Sa4 is electrically coupled to an output terminal of a PWM control circuit to receive an auxiliary control signal which controls the fourth auxiliary switch Sa4 to be turned off or on, wherein the output terminal is different from the output terminal to which the first terminal switch Sa1 is coupled; the first terminal of the fourth switch Sa4 is electrically coupled to a cathode of the diode Da'; the second terminal of the fourth switch Sa4 is electrically coupled to a second terminal of the auxiliary winding Wb, and a first terminal of the auxiliary winding Wb is electrically coupled to an anode of the diode Da'. The PWM control circuit controls the first auxiliary control module and/or the second auxiliary control module to be turned on or off by outputting the auxiliary control signal to the first auxiliary switch Sa1 and the fourth auxiliary switch Sa4, which is useful for better controlling the second synchronous rectifier SR2 and/or the first synchronous rectifier SR1 to be turned off, and thus, the shoot-through problem in the synchronous rectifying apparatus could be efficiently solved, and additional power loss and unnecessary electromagnetic interference could be avoided.

Seventh Embodiment

Figure 10:
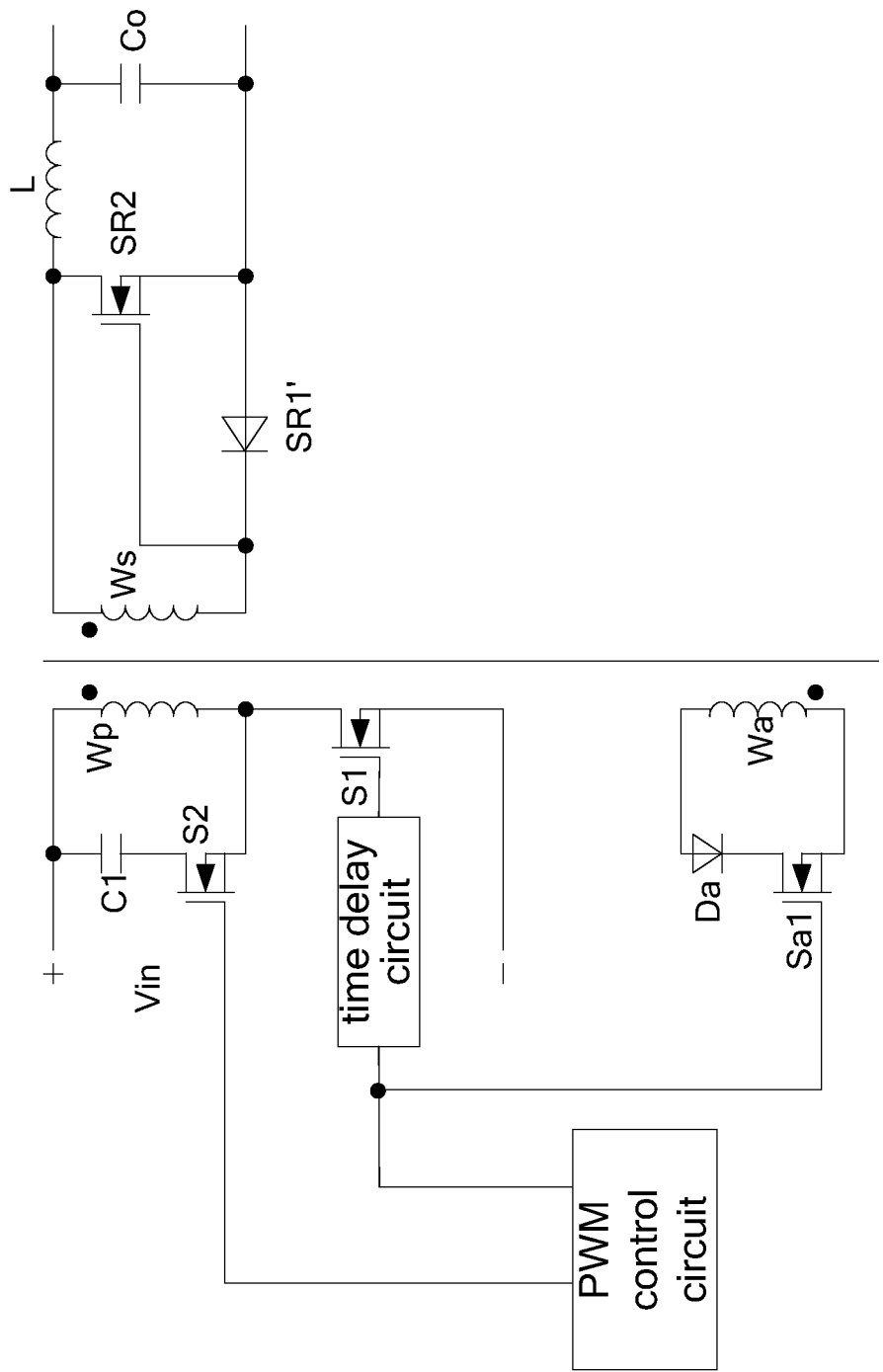
FIG. 10 is a schematic circuit diagram of a synchronous rectifying apparatus according to a seventh embodiment of the present application.
Figures 1, 10:
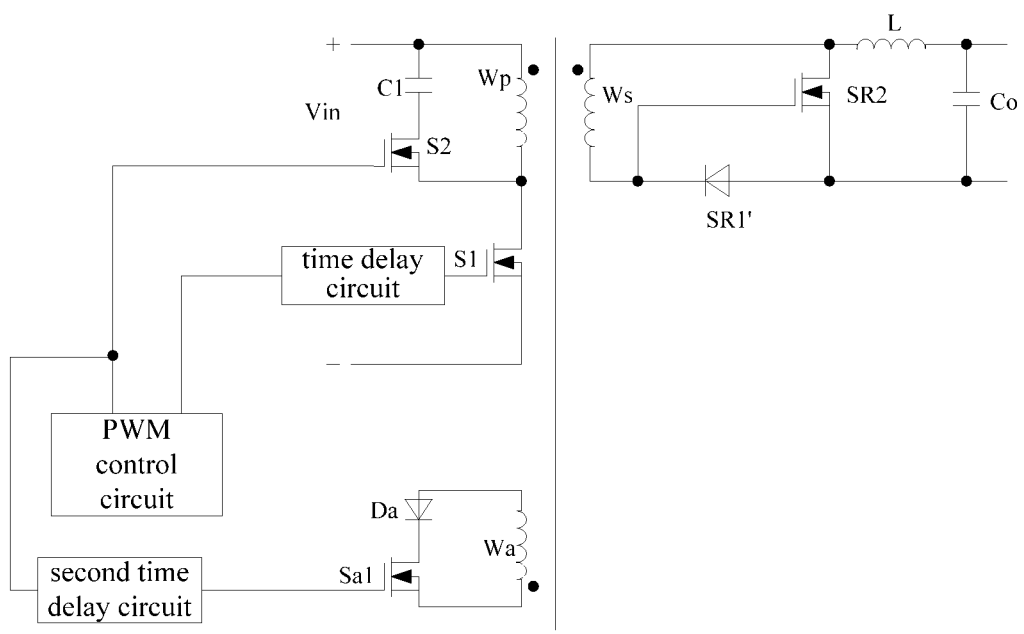

As shown in FIG. 10, different from the synchronous rectifying apparatus shown in FIG. 3, a synchronous rectifying apparatus according to the present embodiment further includes a first time delay circuit. An input terminal of the first time delay circuit is electrically coupled to an output terminal of a PWM control terminal and a control terminal of an auxiliary switch Sa1, and an output terminal of the first time delay circuit is electrically coupled to a control terminal of a transfer switch S1 and outputs a switching control signal for delaying a predefined time period. It is noted that the first time delay circuit may be also electrically coupled between a control terminal of the transfer switch of a full-bridge circuit or a half-bridge circuit, and a common point between the control terminal of the auxiliary switch and the output terminal of the PWM control circuit. It is noted that the synchronous rectifying apparatus further includes a second time delay circuit (see FIG. 10-1). An input terminal of the second time delay circuit is electrically coupled to the control terminal of the PWM control circuit and a control terminal of the reset switch S2, and an output terminal of the second time delay circuit is electrically coupled to the control terminal of the auxiliary switch Sa1 and outputs an auxiliary control signal for delaying a predefined time period. The second time delay circuit may be the same circuit with the first time delay circuit. Also, different from the rectifying circuit in the apparatus shown in FIG. 3, the rectifying circuit in the apparatus according to the present embodiment includes a first rectifier SR1' (may be a diode) and a second synchronous rectifier SR2. A cathode of the first rectifier SR1' is electrically coupled to a second terminal of a secondary winding Ws. The second synchronous rectifier SR2 has a first terminal, a second terminal and a control terminal. The first terminal is electrically coupled to a first terminal of the secondary winding Ws, the second terminal is electrically coupled to an anode of the first synchronous rectifier SR1', and the control terminal is electrically coupled to the cathode of the first synchronous rectifier SR1' and the second terminal of the secondary winding Ws.

Figure 11:
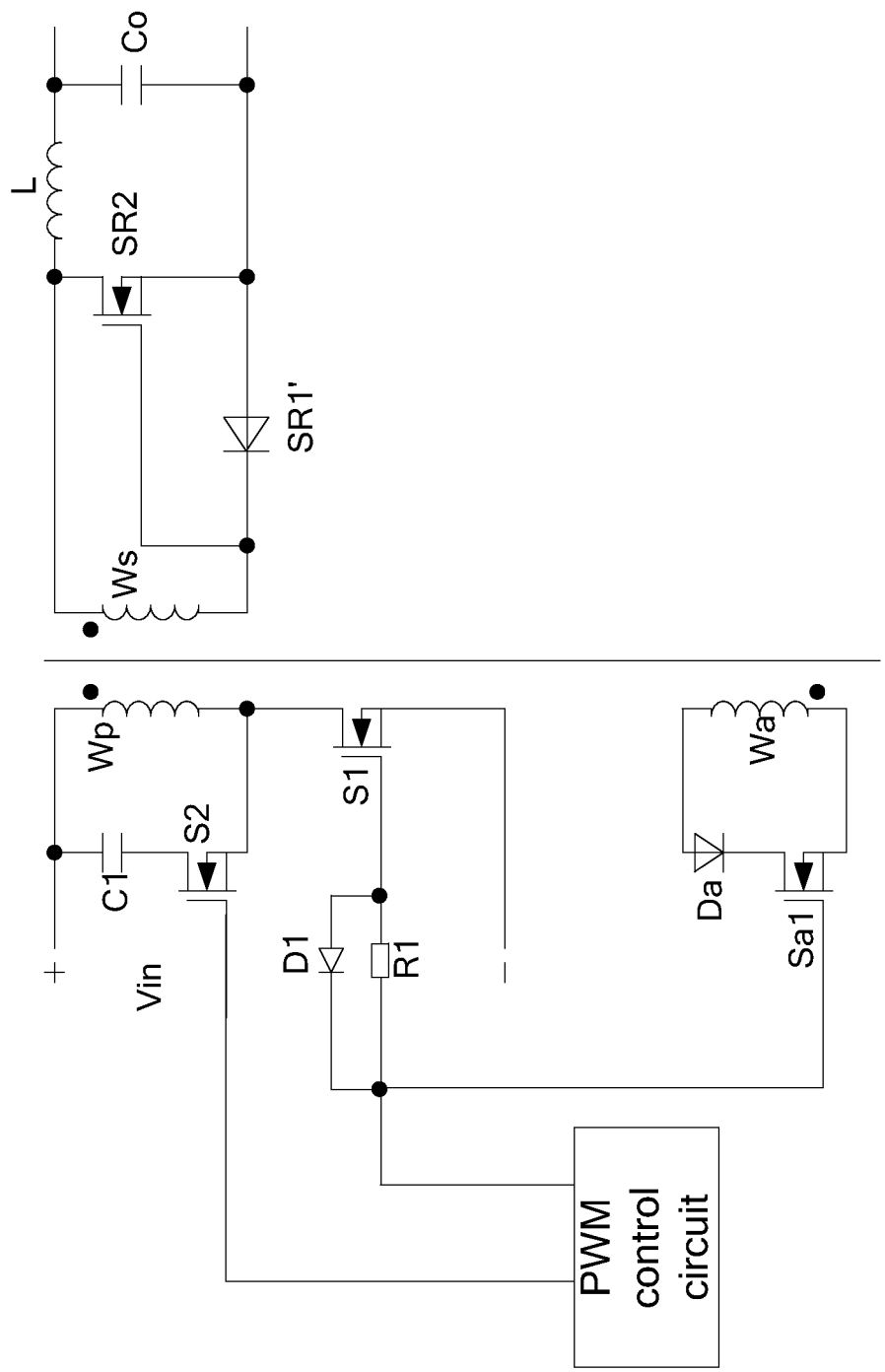
FIG. 11 is a schematic circuit diagram of a time delay circuit of the synchronous rectifying apparatus shown in FIG. 10.

FIG. 11 shows a schematic circuit diagram of the first time delay circuit in the synchronous rectifying apparatus shown in FIG. 10, this time delay circuit includes a diode D1 and a resistor R1 which are connected in parallel. A first terminal of the parallel circuit is electrically coupled to an output terminal of the PWM control circuit and a control terminal of a first auxiliary switch Sa1, and a second terminal is electrically coupled to a control terminal of a transfer switch S1.

It is noted that in the apparatuses in FIGS. 10 and 11, the self-driving circuit of the second synchronous rectifier SR2 is the secondary winding Ws. It is pointed out that the self-driving circuit of the second synchronous rectifier SR2 may also be the filtering inductor L, or the self-driving circuit of the apparatuses shown in FIGS. 7 and 8.

The switching control signal outputted from the PWM control circuit to the transfer switch S1 is delayed with respect to the auxiliary control signal outputted to the auxiliary switch Sa1 through the time delay circuit of the present embodiment, thereby the auxiliary control circuit and the transfer switch S1 could be controlled better, and thus it is more useful for controlling the second synchronous rectifier SR2 to be turned off, the shoot-through problem in the synchronous rectifying apparatus could be efficiently solved, and additional power loss and unnecessary electromagnetic interference could be avoided.

Though the present application has been described by referring to typical embodiments, it should be understood that the terms used herein are only illustrative and exemplary, but not limitative terms. It should also be understood by those skilled in the art, the present application can be implemented in many forms without departing from the spirit or the substance of the present application, the above embodiments are not limited to any aforesaid details, but shall be broadly explained within the spirit and scope defined by the appended claims. Thus, all the changes and modifications which fall into the scope of the claims or the equivalents are intended to be covered by the appended claims.

What is claimed is:

1. A synchronous rectifying apparatus, comprising:
a transformer including a primary winding and a secondary winding;
a primary circuit including at least one transfer switch and being electrically coupled to the primary winding;
a rectifying circuit including at least one synchronous rectifier and being electrically coupled to the secondary winding;
a self-driving circuit electrically coupled to the rectifying circuit and outputting a self-driving signal;
a Pulse Width Modulation control circuit electrically coupled to the primary circuit and outputting at least one switching control signal and at least one auxiliary control signal; and
an auxiliary control module including at least one auxiliary control circuit and at least one auxiliary winding, wherein the auxiliary control circuit includes at least one auxiliary switch and is electrically coupled to the Pulse Width Modulation control circuit and the auxiliary winding via the auxiliary switch, and the auxiliary winding is electrically coupled to the transformer;
wherein before the transfer switch is controlled to be turned on by the switching control signal, the auxiliary switch is controlled to be turned on by the auxiliary control signal, and the synchronous rectifier of the rectifying circuit is controlled to be turned off through the self-driving signal.

2. The synchronous rectifying apparatus according to claim 1, wherein the auxiliary control circuit includes:
a first auxiliary switch having a first terminal, a second terminal, and a control terminal, the second terminal thereof being electrically coupled to a first terminal of the auxiliary winding, and the control terminal thereof being electrically coupled to an output terminal of the Pulse Width Modulation control circuit to receive the auxiliary control signal; and
a diode, an anode thereof being electrically coupled to a second terminal of the auxiliary winding, and a cathode thereof being electrically coupled to a first terminal of the first auxiliary switch.

3. The synchronous rectifying apparatus according to claim 1, wherein the auxiliary control circuit includes:
a second auxiliary switch having a first terminal, a second terminal, and a control terminal, the first terminal thereof being electrically coupled to a second terminal of the auxiliary winding, and the control terminal thereof being electrically coupled to an output terminal of the Pulse Width Modulation control circuit to receive the auxiliary control signal; and
a third auxiliary switch having a first terminal, a second terminal, and a control terminal, the first terminal thereof being electrically coupled to a first terminal of the auxiliary winding, the second terminal thereof being electrically coupled to a second terminal of the second auxiliary switch, and the control terminal thereof being electrically coupled to another output terminal of the Pulse Width Modulation control circuit to receive the auxiliary control signal.

4. The synchronous rectifying apparatus according to claim 1, wherein the auxiliary control signal outputted from the Pulse Width Modulation control circuit is a periodic control signal or a non-periodic control signal.

5. The synchronous rectifying apparatus according to claim 1, further comprising a first time delay circuit, wherein an input terminal of the first time delay circuit is electrically coupled to an output terminal of the Pulse Width Modulation control circuit and a control terminal of the auxiliary switch, and an output terminal of the first time delay circuit is electrically coupled to a control terminal of the transfer switch to output a switching control signal for delaying a predefined time period.

6. The synchronous rectifying apparatus according to claim 1, wherein the primary circuit includes a first transfer switch, a first terminal of the first transfer switch being electrically coupled to a second terminal of the primary winding, a second terminal of the first transfer switch being electrically coupled to a second output terminal of a power supply, a control terminal of the first transfer switch being electrically coupled to an output terminal of the Pulse Width Modulation control circuit, and a first terminal of the primary circuit being electrically coupled to a first output terminal of the power supply.

7. The synchronous rectifying apparatus according to claim 6, further comprising a reset circuit, wherein the reset circuit bridges over two sides of the primary circuit; or the reset circuit bridges over two sides of the secondary winding;

or the reset circuit bridges over two sides of an additional winding electrically coupled to the transformer.

8. The synchronous rectifying apparatus according to claim 7, wherein the reset circuit is an active clamp reset circuit, or the reset circuit consisted of a third winding, or the reset circuit is a Resistor Capacitor and Diode reset circuit, or the reset circuit is an Inductor Capacitor and Diode reset circuit, or the reset circuit is a resonance reset circuit.

9. The synchronous rectifying apparatus according to claim 6, further comprising a reset circuit, wherein the reset circuit bridges over two sides of the primary circuit and is an active clamp reset circuit, and the active clamp reset circuit includes a reset switch and a capacitor, a first terminal of the reset switch being electrically coupled to the first terminal of the primary winding and the first output terminal of the power supply via the capacitor, a second terminal of the reset switch being electrically coupled to a common point between the first terminal of the transfer switch and the second terminal of the primary winding, and a control terminal of the reset switch being electrically coupled to the output terminal of the Pulse Width Modulation control circuit.

10. The synchronous rectifying apparatus according to claim 9, further comprising a second time delay circuit, wherein an input terminal of the second time delay circuit is electrically coupled to the output terminal of the Pulse Width Modulation control circuit and the control terminal of the reset switch, and an output terminal of the second time delay circuit is electrically coupled to the control terminal of the auxiliary switch to output the auxiliary control signal for delaying a predefined time period.

11. The synchronous rectifying apparatus according to claim 1, wherein the primary circuit includes a first transfer switch, a second transfer switch, a third transfer switch, and a fourth transfer switch, a first terminal of the first transfer switch being electrically coupled to a first terminal of the second transfer switch and a first output terminal of a power supply, a second terminal of the first transfer switch being electrically coupled to a first terminal of the third transfer switch, a second terminal of the second transfer switch being electrically coupled to a first terminal of the fourth transfer switch, a second terminal of third transfer switch being electrically coupled to a second terminal of the fourth terminal and a second output terminal of the power supply, the control terminals of the first transfer switch, the second transfer switch, the third transfer switch, and the fourth transfer switch being respectively electrically coupled to an output terminal of the Pulse Width Modulation control circuit to receive the corresponding switching control signal; a first terminal of the primary winding being electrically coupled to a common point between the second terminal of the second transfer switch and the first terminal of the fourth transfer switch, and a second terminal of the primary winding being electrically coupled to a common point between the second terminal of the first transfer switch and the first terminal of the third transfer switch.

12. The synchronous rectifying apparatus according to claim 1, wherein the rectifying circuit includes:
a first synchronous rectifier having a first terminal, a second terminal, and a control terminal, the first terminal thereof being electrically coupled to a second terminal of the secondary winding, and the control terminal thereof being electrically coupled to the self-driving circuit;
a second synchronous rectifier having a first terminal, a second terminal, and a control terminal, the first terminal thereof being electrically coupled to a first terminal of the secondary winding, the second terminal thereof being electrically coupled to a second terminal of the first synchronous rectifier, and the control terminal thereof being electrically coupled to the self-driving circuit.

13. The synchronous rectifying apparatus according to claim 12, wherein the self-driving circuit is the secondary winding, the first terminal of the secondary winding being electrically coupled to the control terminal of the first synchronous rectifying apparatus, and the second terminal of the secondary winding being electrically coupled to the control terminal of the second rectifying apparatus.

14. The synchronous rectifying apparatus according to claim 12, further comprising a first winding, a second winding, and a third winding, wherein the second winding and the third winding constitute the self-driving circuit for supplying the self-driving signal to the first synchronous rectifier and the second synchronous rectifier; the first terminal of the second synchronous rectifier is electrically coupled to the first terminal of the secondary winding via the first winding, the second terminal of the second synchronous rectifier is electrically coupled to the first terminal of the third winding, the second terminal of the second winding, and the second terminal of the first synchronous rectifier, the control terminal of the second synchronous rectifier is electrically coupled to the second terminal of the third winding; the first terminal of the first synchronous rectifier is electrically coupled to the second terminal of the secondary winding, and the control terminal of the first synchronous rectifier is electrically coupled to the first terminal of the second winding.

15. The synchronous rectifying apparatus according to claim 12, wherein the self-driving circuit includes a fourth winding, a first diode, and a second diode, a first terminal of the fourth winding being electrically coupled to the control terminal of the first synchronous rectifier and a cathode of the first diode, a second terminal of the fourth winding being electrically coupled to the control terminal of the second synchronous rectifier and a cathode of the second diode, the anode of the first diode and the anode of the second diode being electrically coupled to the second terminal of the first synchronous rectifier and the second terminal of the second synchronous rectifier, the first terminal of the second synchronous rectifier being electrically coupled to the first terminal of the secondary winding, and the first terminal of the first synchronous rectifier being electrically coupled to the second terminal of the secondary winding.

16. The synchronous rectifying apparatus according to claim 1, wherein the rectifying circuit includes:
a first rectifier having an anode and a cathode, the cathode thereof being electrically coupled to the second terminal of the secondary winding;
a second synchronous rectifier having a first terminal, a second terminal, and a control terminal, the first terminal thereof being electrically coupled to the first terminal of the secondary winding, the second terminal thereof being electrically coupled to the anode of the first rectifier, and the control terminal thereof being electrically coupled to the self-driving circuit.

17. The synchronous rectifying apparatus according to claim 16, wherein the self-driving circuit is the secondary winding, and the control terminal of the second synchronous rectifier is electrically coupled to the second terminal of the secondary winding.

18. A method for controlling a synchronous rectifying apparatus which comprises:
a transformer including a primary winding and a secondary winding; a primary circuit including at least one transfer switch and being electrically coupled to the primary winding; a rectifying circuit including at least one synchronous rectifier and being electrically coupled to the secondary winding; a self-driving circuit electrically coupled to the rectifying circuit and outputting a self-driving signal; a Pulse Width Modulation control circuit electrically coupled to the primary circuit and outputting at least one switching control signal and at least one auxiliary control signal; wherein the method comprises the following steps:

provide an auxiliary control module including at least one auxiliary control circuit and at least one auxiliary winding, the auxiliary control circuit including at least one auxiliary switch and being electrically coupled to the Pulse Width Modulation control circuit and the auxiliary winding via the auxiliary switch, and the auxiliary winding being electrically coupled to the transformer;

before the transfer switch is controlled to be turned on by the switching control signal, the auxiliary switch is controlled to be turned on by the auxiliary control signal, and the synchronous rectifier of the rectifying circuit is controlled to be turned off through the self-driving signal.

19. The controlling method according to claim 18, further comprising providing a first auxiliary switch and a diode, the first auxiliary switch and the diode constitute the auxiliary control circuit, wherein:

the first auxiliary switch has a first terminal, a second terminal, and a control terminal, the second terminal thereof being electrically coupled to a first terminal of the auxiliary winding, and the control terminal thereof being electrically coupled to an output terminal of the Pulse Width Modulation control circuit to receive the auxiliary control signal;

an anode of the diode is electrically coupled to a second terminal of the auxiliary winding, a cathode of the diode is electrically coupled to the first terminal of the first auxiliary switch, and the auxiliary winding is electrically coupled to the transformer.

20. The controlling method according to claim 18, further comprising providing a second auxiliary switch and a third auxiliary switch, the second auxiliary switch and the third switch constitute the auxiliary control circuit, wherein the second auxiliary switch has a first terminal, a second terminal, and a control terminal, the first terminal thereof being electrically coupled to a second terminal of the auxiliary winding, and the control terminal thereof being electrically coupled to an output terminal of the Pulse Width Modulation control circuit to receive the auxiliary control signal; and the third auxiliary switch has a first terminal, a second terminal, and a control terminal, the first terminal thereof being electrically coupled to a first terminal of the auxiliary winding, the second terminal thereof being electrically coupled to the second terminal of the second auxiliary switch, the control terminal thereof being electrically coupled to another output terminal of the Pulse Width Modulation control circuit to receive the auxiliary control signal; and the auxiliary winding being electrically coupled to the transformer.

21. The controlling method according to claim 18, further comprising providing a time delay circuit in the primary circuit, an input terminal of the time delay circuit being electrically coupled to an output terminal of the Pulse Width Modulation control circuit, and an output terminal of the time delay circuit being electrically coupled to a control terminal of the transfer switch to output the switching control signal for delaying a predefined time period.

* * * * *